US012779807B2

(12) United States Patent
Reiter et al.

(10) Patent No.: US 12,779,807 B2
(45) Date of Patent: Nov. 3, 2026

(54) COMPACTING TOOL

(71) Applicant: MILWAUKEE ELECTRIC TOOL CORPORATION, Brookfield, WI (US)

(72) Inventors: Joseph C. Reiter, Milwaukee, WI (US); Daryl S. Richards, Sussex, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 744 days.

(21) Appl. No.: 18/065,907

(22) Filed: Dec. 14, 2022

(65) Prior Publication Data

US 2023/0191737 A1 Jun. 22, 2023

Related U.S. Application Data

(60) Provisional application No. 63/290,681, filed on Dec. 17, 2021.

(51) Int. Cl.

| | |
|---|---|
| ***E01C 19/34*** | (2006.01) |
| ***B30B 11/02*** | (2006.01) |
| ***B30B 15/06*** | (2006.01) |

(52) U.S. Cl.

CPC .......... *B30B 11/022* (2013.01); *B30B 15/065* (2013.01); *E01C 19/34* (2013.01)

(58) Field of Classification Search

CPC ..... B30B 11/022; B30B 15/065; E01C 19/34; E01C 19/35; E01C 19/38; E02D 3/068

See application file for complete search history.

(56) References Cited

U.S. PATENT DOCUMENTS

| | | | |
|---|---|---|---|
| 2,176,801 | A | 10/1939 | Giosue |
| RE23,763 | E | 1/1954 | Brown |
| 2,845,050 | A | 7/1958 | Wacker et al. |
| 2,884,842 | A | 5/1959 | Schmitz |

(Continued)

FOREIGN PATENT DOCUMENTS

| | | | |
|---|---|---|---|
| CN | 86209358 | U | 9/1987 |
| CN | 2121481 | U | 11/1992 |

(Continued)

OTHER PUBLICATIONS

European Patent Office Action for Application No. 22214019.6 dated Mar. 26, 2025 (5 pages).

(Continued)

*Primary Examiner* — Abigail A Risic

(74) *Attorney, Agent, or Firm* — Michael Best & Friedrich LLP

(57) ABSTRACT

A compacting tool includes an upper mass, a lower mass coupled to the upper mass, a driving axis extending centrally through the upper mass and the lower mass, a motive source supported by the upper mass, the motive source including an output shaft, a battery configured to provide power to the motive source, a handle coupled to the upper mass, a user interface supported by the handle and configured to receive an input to control the motive source, and a drive mechanism configured to convert rotational movement of the output shaft to reciprocating movement of the lower mass. The drive mechanism includes a multi-stage transmission operatively coupled between the output shaft of the motive source and the lower mass.

19 Claims, 8 Drawing Sheets

(56) References Cited

U.S. PATENT DOCUMENTS 2,942,589 A 6/1960 Wacker
3,090,286 A 5/1963 Kestel
3,109,354 A 11/1963 Kirk
3,232,188 A 2/1966 Frohnauer, Jr.
3,248,957 A 5/1966 Giosue
3,270,635 A 9/1966 Kestel
3,277,801 A 10/1966 Horvath et al.
3,286,790 A 11/1966 Kestel
3,308,728 A 3/1967 Brown
3,308,729 A 3/1967 Kestel
3,386,303 A 6/1968 Curlett
3,410,145 A 11/1968 Uebel
3,416,418 A 12/1968 Frohnauer, Jr.
3,421,377 A 1/1969 Wittig
3,483,805 A 12/1969 Hirn et al.
3,491,662 A 1/1970 Beierlein et al.
3,492,924 A 2/1970 Fors et al.
3,497,017 A 2/1970 Goettl et al.
3,603,225 A 9/1971 Buck
3,630,127 A 12/1971 Yamato
3,832,081 A 8/1974 Opderbeck et al.
3,847,498 A 11/1974 Grane et al.
3,856,426 A 12/1974 Waschulewski et al.
3,892,280 A 7/1975 Klushin et al.
3,899,262 A 8/1975 Yamamoto
4,005,944 A 2/1977 Harris
4,014,620 A 3/1977 Vural et al.
4,015,909 A 4/1977 Yamamoto
4,082,471 A 4/1978 Hiszpanski
4,104,001 A 8/1978 Uebel
4,156,576 A 5/1979 Clavel et al.
4,170,427 A 10/1979 Grane
4,186,197 A 1/1980 Tetsuo
4,375,927 A 3/1983 Kniep
4,397,590 A 8/1983 Friesen et al.
4,442,731 A 4/1984 Burger
4,557,336 A 12/1985 Denise
4,609,055 A 9/1986 Grafstrom
4,867,606 A 9/1989 Wright
4,895,478 A 1/1990 Artzberger
5,261,762 A 11/1993 Yamaguchi
5,340,233 A 8/1994 Motl
5,632,569 A 5/1997 Szmansky
5,645,370 A 7/1997 Zurbes et al.
5,733,071 A 3/1998 Shudo
5,837,298 A 11/1998 Face, Jr. et al.
6,000,879 A 12/1999 Greppmair
6,019,179 A 2/2000 Zurbes
6,267,532 B1 7/2001 Persson
6,293,729 B1 9/2001 Greppmair
6,302,622 B1 10/2001 Nagasawa
6,327,923 B1 12/2001 Greppmair
6,352,004 B1 3/2002 Greppmair
6,374,569 B1 4/2002 Suckow
6,390,034 B1 5/2002 Orzal et al.
6,392,329 B1 5/2002 Bryant et al.
6,394,697 B1 5/2002 De Boer
6,409,426 B1 6/2002 MacLellan
6,419,420 B2 7/2002 Hedlund
6,443,651 B1 9/2002 Greppmair
6,474,300 B1 11/2002 Steffen
6,558,073 B1 5/2003 Wrazidlo
6,582,155 B1 6/2003 Bromberger et al.
6,584,866 B2 7/2003 Greppmair
6,601,465 B2 8/2003 Greppmain
6,749,365 B2 6/2004 Sina et al.
6,758,632 B2 7/2004 Hausler et al.
6,848,858 B1 2/2005 Greppmair
6,854,923 B2 2/2005 Greppmair
6,981,819 B1 1/2006 Suckow et al.
D531,863 S 11/2006 Irwin
7,174,970 B2 2/2007 Kremer
7,303,356 B2 12/2007 Schennach et al.
7,316,524 B1 1/2008 Pikuet
7,387,466 B2 6/2008 Irwin
7,413,028 B2 8/2008 Comarmond
7,465,121 B1 12/2008 Hendricks et al.
7,540,277 B2 6/2009 Hedlund
7,540,336 B2 6/2009 Steffen
7,682,102 B1 3/2010 Burke et al.
7,740,416 B2 6/2010 Lesche
7,896,575 B2 3/2011 Schulenberg et al.
8,047,742 B2 11/2011 Sick et al.
8,057,124 B2 11/2011 Stenzel et al.
8,057,125 B2 11/2011 Grinwald
8,128,105 B2 3/2012 Filiatrault et al.
8,172,240 B2 5/2012 Zimmerman et al.
8,202,022 B2 6/2012 Grinwald
8,317,426 B2 11/2012 Steffen
8,414,221 B2 4/2013 Faucher et al.
8,491,222 B2 7/2013 Bonnemann
8,523,480 B2 9/2013 Laugwitz
8,708,599 B2 4/2014 Steffen
8,974,153 B2 3/2015 Steffen
9,045,876 B2 6/2015 Laugwitz et al.
9,175,447 B2 11/2015 Steffen
9,284,697 B2 3/2016 Steffen
9,580,879 B1 * 2/2017 Williams ................ E01C 19/32
9,611,596 B2 4/2017 Becker et al.
9,695,566 B2 7/2017 Braun
9,777,453 B2 10/2017 Hamilton
9,789,579 B2 10/2017 Fukushima et al.
9,863,111 B2 1/2018 Becker et al.
10,378,169 B2 8/2019 Hamilton
10,781,566 B2 9/2020 Paske
10,801,167 B2 10/2020 Laugwitz et al.
10,968,574 B2 4/2021 Mikowychok
11,059,155 B2 7/2021 Zawisza et al.
11,274,403 B2 3/2022 Koseki et al.
2003/0021638 A1 1/2003 Levine
2004/0071509 A1 4/2004 Albert, II
2004/0234337 A1 11/2004 Burkert et al.
2005/0036837 A1 2/2005 Marshall
2005/0163566 A1 7/2005 Lindely
2006/0165488 A1 7/2006 Morris et al.
2007/0137975 A1 6/2007 Tanaka et al.
2007/0277772 A1 12/2007 Tanaka et al.
2008/0050177 A1 2/2008 Sager
2010/0284743 A1 11/2010 Steffen
2010/0296869 A1 11/2010 Catanzarite et al.
2011/0091279 A1 4/2011 Kuerten
2011/0164924 A1 7/2011 Bingham et al.
2012/0076584 A1 3/2012 Bonnemann et al.
2012/0087727 A1 4/2012 Bonnemann
2012/0183351 A1 7/2012 Brening
2012/0282027 A1 11/2012 Nick et al.
2013/0004237 A1 1/2013 Krings et al.
2013/0279980 A1 * 10/2013 Steffen .................... E02D 3/074
404/133.05
2014/0076596 A1 * 3/2014 Fukushima ............. F02D 45/00
173/176
2014/0262400 A1 9/2014 Berger et al.
2016/0032548 A1 2/2016 Braun
2016/0340849 A1 11/2016 Paske
2018/0258601 A1 9/2018 Rupp et al.
2020/0318307 A1 10/2020 Paske
2021/0143710 A1 5/2021 Sprague et al.
2022/0010504 A1 1/2022 Glanzer et al.
2022/0010505 A1 1/2022 Glanzer et al.
2022/0010506 A1 1/2022 Glanzer et al.
2022/0018073 A1 1/2022 Mizuguchi et al.
2022/0049507 A1 2/2022 Reiter et al.
2022/0064877 A1 3/2022 Glanzer et al.

FOREIGN PATENT DOCUMENTS

CN 2139593 Y 8/1993
CN 2196641 Y 5/1995
CN 2403819 Y 11/2000
CN 2418161 Y 2/2001
CN 2420328 Y 2/2001
CN 2550410 Y 5/2003
CN 2550411 Y 5/2003
CN 2673999 Y 1/2005

(56) References Cited

FOREIGN PATENT DOCUMENTS

| | | | |
|---|---|---|---|
| CN | 2773174 | Y | 4/2006 |
| CN | 2786199 | Y | 6/2006 |
| CN | 2814437 | Y | 9/2006 |
| CN | 2841768 | Y | 11/2006 |
| CN | 200955143 | Y | 10/2007 |
| CN | 200978415 | Y | 11/2007 |
| CN | 201010895 | Y | 1/2008 |
| CN | 201092652 | Y | 7/2008 |
| CN | 201141133 | Y | 10/2008 |
| CN | 201202110 | Y | 3/2009 |
| CN | 201202111 | Y | 3/2009 |
| CN | 201358454 | Y | 12/2009 |
| CN | 201495474 | U | 6/2010 |
| CN | 201495478 | U | 6/2010 |
| CN | 201546219 | U | 8/2010 |
| CN | 201546220 | U | 8/2010 |
| CN | 201554018 | U | 8/2010 |
| CN | 101196003 | B | 9/2010 |
| CN | 201567562 | U | 9/2010 |
| CN | 201567563 | U | 9/2010 |
| CN | 201627134 | U | 11/2010 |
| CN | 201665867 | U | 12/2010 |
| CN | 201873982 | U | 6/2011 |
| CN | 202117330 | U | 1/2012 |
| CN | 202349196 | U | 7/2012 |
| CN | 202401449 | U | 8/2012 |
| CN | 202809595 | U | 3/2013 |
| CN | 203066054 | U | 7/2013 |
| CN | 203247573 | U | 10/2013 |
| CN | 103452092 | B | 12/2013 |
| CN | 203320509 | U | 12/2013 |
| CN | 203320510 | U | 12/2013 |
| CN | 203346867 | U | 12/2013 |
| CN | 203514294 | U | 4/2014 |
| CN | 203625879 | U | 6/2014 |
| CN | 203668910 | U | 6/2014 |
| CN | 204225080 | U | 3/2015 |
| CN | 204252113 | U | 4/2015 |
| CN | 104727290 | A | 6/2015 |
| CN | 104727291 | A | 6/2015 |
| CN | 104727292 | A | 6/2015 |
| CN | 104727293 | A | 6/2015 |
| CN | 104746503 | A | 7/2015 |
| CN | 104746504 | A | 7/2015 |
| CN | 204626372 | U | 9/2015 |
| CN | 204780848 | U | 11/2015 |
| CN | 204875454 | U | 12/2015 |
| CN | 204898642 | U | 12/2015 |
| CN | 105332369 | A | 2/2016 |
| CN | 205171493 | U | 4/2016 |
| CN | 205444156 | U | 8/2016 |
| CN | 205617352 | U | 10/2016 |
| CN | 205636715 | U | 10/2016 |
| CN | 205975568 | U | 2/2017 |
| CN | 205975570 | U | 2/2017 |
| CN | 205975572 | U | 2/2017 |
| CN | 105064317 | B | 3/2017 |
| CN | 106522194 | A | 3/2017 |
| CN | 206015654 | U | 3/2017 |
| CN | 206173941 | U | 5/2017 |
| CN | 206189381 | U | 5/2017 |
| CN | 206308685 | U | 7/2017 |
| CN | 206308686 | U | 7/2017 |
| CN | 206418484 | U | 8/2017 |
| CN | 206521676 | U | 9/2017 |
| CN | 107386262 | A | 11/2017 |
| CN | 107401157 | A | 11/2017 |
| CN | 107604892 | A | 1/2018 |
| CN | 206844094 | U | 1/2018 |
| CN | 206859198 | U | 1/2018 |
| CN | 206902687 | U | 1/2018 |
| CN | 206902688 | U | 1/2018 |
| CN | 206956705 | U | 2/2018 |
| CN | 207003413 | U | 2/2018 |
| CN | 207017244 | U | 2/2018 |
| CN | 207032207 | U | 2/2018 |
| CN | 207047826 | U | 2/2018 |
| CN | 207047827 | U | 2/2018 |
| CN | 107794908 | A | 3/2018 |
| CN | 207109784 | U | 3/2018 |
| CN | 207159986 | U | 3/2018 |
| CN | 207331664 | U | 5/2018 |
| CN | 207348043 | U | 5/2018 |
| CN | 207348044 | U | 5/2018 |
| CN | 207348045 | U | 5/2018 |
| CN | 108221934 | A | 6/2018 |
| CN | 207484450 | U | 6/2018 |
| CN | 207484451 | U | 6/2018 |
| CN | 207484455 | U | 6/2018 |
| CN | 207498782 | U | 6/2018 |
| CN | 207498932 | U | 6/2018 |
| CN | 207525585 | U | 6/2018 |
| CN | 207538021 | U | 6/2018 |
| CN | 108330944 | A | 7/2018 |
| CN | 207633173 | U | 7/2018 |
| CN | 108374405 | A | 8/2018 |
| CN | 207775863 | U | 8/2018 |
| CN | 108487224 | A | 9/2018 |
| CN | 108661041 | A | 10/2018 |
| CN | 207959177 | U | 10/2018 |
| CN | 207959178 | U | 10/2018 |
| CN | 207974097 | U | 10/2018 |
| CN | 208009208 | U | 10/2018 |
| CN | 208009396 | U | 10/2018 |
| CN | 108797556 | A | 11/2018 |
| CN | 108914922 | A | 11/2018 |
| CN | 208105235 | U | 11/2018 |
| CN | 208121514 | U | 11/2018 |
| CN | 208121742 | U | 11/2018 |
| CN | 208121743 | U | 11/2018 |
| CN | 208167704 | U | 11/2018 |
| CN | 208167706 | U | 11/2018 |
| CN | 208219610 | U | 12/2018 |
| CN | 208293554 | U | 12/2018 |
| CN | 208293555 | U | 12/2018 |
| CN | 208346794 | U | 1/2019 |
| CN | 208346796 | U | 1/2019 |
| CN | 208363074 | U | 1/2019 |
| CN | 208472696 | U | 2/2019 |
| CN | 208618387 | U | 3/2019 |
| CN | 208633092 | U | 3/2019 |
| CN | 107059562 | B | 4/2019 |
| CN | 109555103 | A | 4/2019 |
| CN | 208701648 | U | 4/2019 |
| CN | 208717892 | U | 4/2019 |
| CN | 208733607 | U | 4/2019 |
| CN | 208733608 | U | 4/2019 |
| CN | 208733609 | U | 4/2019 |
| CN | 208733610 | U | 4/2019 |
| CN | 208733611 | U | 4/2019 |
| CN | 208762996 | U | 4/2019 |
| CN | 109701918 | A | 5/2019 |
| CN | 208815503 | U | 5/2019 |
| CN | 208844537 | U | 5/2019 |
| CN | 109898392 | A | 6/2019 |
| CN | 208996017 | U | 6/2019 |
| CN | 209010913 | U | 6/2019 |
| CN | 209053084 | U | 7/2019 |
| CN | 209429107 | U | 9/2019 |
| CN | 209703476 | U | 11/2019 |
| CN | 209722936 | U | 12/2019 |
| CN | 209779602 | U | 12/2019 |
| CN | 209958332 | U | 1/2020 |
| CN | 209975496 | U | 1/2020 |
| CN | 210341878 | U | 4/2020 |
| CN | 210481967 | U | 5/2020 |
| CN | 210482276 | U | 5/2020 |
| CN | 210509404 | U | 5/2020 |
| CN | 210597264 | U | 5/2020 |
| CN | 108867613 | B | 6/2020 |
| CN | 111218882 | A | 6/2020 |
| CN | 210657894 | U | 6/2020 |
| CN | 210657895 | U | 6/2020 |
| CN | 210684653 | U | 6/2020 |

(56) References Cited

FOREIGN PATENT DOCUMENTS

| | | | | |
|---|---|---|---|---|
| CN | 210712806 | U | 6/2020 | |
| CN | 210712809 | U | 6/2020 | |
| CN | 210766268 | U | 6/2020 | |
| CN | 210827415 | U | 6/2020 | |
| CN | 210886843 | U | 6/2020 | |
| CN | 210887182 | U | 6/2020 | |
| CN | 211143043 | U | 7/2020 | |
| CN | 211171912 | U | 8/2020 | |
| CN | 211368663 | U | 8/2020 | |
| CN | 211395638 | U | 9/2020 | |
| CN | 211421097 | U | 9/2020 | |
| CN | 211421098 | U | 9/2020 | |
| CN | 211421099 | U | 9/2020 | |
| CN | 211523172 | U | 9/2020 | |
| CN | 211547200 | U | 9/2020 | |
| CN | 211621540 | U | 10/2020 | |
| CN | 211872962 | U | 11/2020 | |
| CN | 211947816 | U | 11/2020 | |
| CN | 212001029 | U | 11/2020 | |
| CN | 108708363 | B | 12/2020 | |
| CN | 110630725 | B | 12/2020 | |
| CN | 212104010 | U | 12/2020 | |
| CN | 212426645 | U | 1/2021 | |
| CN | 212641126 | U | 3/2021 | |
| CN | 212801483 | U | 3/2021 | |
| CN | 212834879 | U | 3/2021 | |
| CN | 112663591 | A | 4/2021 | |
| CN | 212865899 | U | 4/2021 | |
| CN | 213233055 | U | 5/2021 | |
| CN | 213233061 | U | 5/2021 | |
| CN | 213508411 | U | 6/2021 | |
| CN | 213571422 | U | 6/2021 | |
| CN | 213653424 | U | 7/2021 | |
| CN | 213683108 | U | 7/2021 | |
| CN | 213772831 | U | 7/2021 | |
| CN | 213897073 | U | 8/2021 | |
| CN | 214363409 | U | 10/2021 | |
| CN | 214783108 | U | 11/2021 | |
| CN | 214996094 | U | 12/2021 | |
| CN | 215104450 | U | 12/2021 | |
| CN | 215593957 | U | 1/2022 | |
| CN | 216108427 | U | 3/2022 | |
| CN | 216238472 | U | 4/2022 | |
| CN | 224301026 | U | 5/2026 | |
| DE | 236898 | C | 7/1911 | |
| DE | 706411 | C | 5/1941 | |
| DE | 743378 | C | 12/1942 | |
| DE | 940122 | C | 3/1956 | |
| DE | 1048536 | B | 1/1959 | |
| DE | 1077154 | B | 3/1960 | |
| DE | 1091046 | B | 10/1960 | |
| DE | 1097733 | B | 1/1961 | |
| DE | 1849994 | U | 4/1962 | |
| DE | 1852243 | U | 5/1962 | |
| DE | 1146006 | B | 3/1963 | |
| DE | 1869386 | U | 3/1963 | |
| DE | 1900250 | U | 9/1964 | |
| DE | 1179876 | B | 10/1964 | |
| DE | 1903992 | U | 11/1964 | |
| DE | 1941695 | U | 6/1966 | |
| DE | 1952786 | U | 12/1966 | |
| DE | 1239634 | B | 4/1967 | |
| DE | 1967682 | U | 8/1967 | |
| DE | 1968578 | U | 9/1967 | |
| DE | 1253177 | B | 10/1967 | |
| DE | 1274387 | B | 8/1968 | |
| DE | 1290745 | B | 3/1969 | |
| DE | 1484513 | A1 | 4/1969 | |
| DE | 6602048 | U | 4/1969 | |
| DE | 1634542 | A1 | 6/1970 | |
| DE | 1916396 | A1 | 9/1970 | |
| DE | 6606542 | U | 10/1970 | |
| DE | 1925870 | A1 | 11/1970 | |
| DE | 1911878 | A1 | 12/1970 | |
| DE | 6606577 | U | 12/1970 | |
| DE | 1954652 | A1 | 5/1971 | |
| DE | 1810764 | A1 | 6/1971 | |
| DE | 1708552 | B1 | 7/1971 | |
| DE | 2020944 | A1 | 11/1971 | |
| DE | 1784995 | A1 | 3/1972 | |
| DE | 2046763 | A1 | 3/1972 | |
| DE | 2121064 | A1 | 11/1972 | |
| DE | 2133454 | A1 | 1/1973 | |
| DE | 2155687 | A1 | 5/1973 | |
| DE | 2218772 | A1 | 10/1973 | |
| DE | 2510770 | A1 | 9/1976 | |
| DE | 2551776 | A1 | 5/1977 | |
| DE | 2710866 | A1 | 9/1978 | |
| DE | 7734235 | U1 | 4/1979 | |
| DE | 2855805 | A1 | 6/1979 | |
| DE | 7707668 | U1 | 10/1979 | |
| DE | 2948563 | A1 | 6/1981 | |
| DE | 3203146 | A1 | 8/1983 | |
| DE | 3303531 | A1 | 9/1983 | |
| DE | 3221240 | A1 | 12/1983 | |
| DE | 3439534 | A1 | 5/1986 | |
| DE | 3532174 | A1 | 3/1987 | |
| DE | 8525744 | U1 | 1/1988 | |
| DE | 8808451 | U1 | 9/1988 | |
| DE | 9013243 | U1 | 2/1991 | |
| DE | 4445188 | A1 | 6/1996 | |
| DE | 19752445 | C1 | 8/1999 | |
| DE | 20004568 | U1 | 9/2000 | |
| DE | 20011939 | U1 | 9/2000 | |
| DE | 19956490 | A1 | 6/2001 | |
| DE | 202006008542 | U1 | 9/2006 | |
| DE | 102008045557 | A1 | 3/2010 | |
| DE | 102009004442 | A1 | 7/2010 | |
| DE | 102009050814 | A1 | 8/2010 | |
| DE | 202013005536 | U1 | 6/2013 | |
| DE | 202013005537 | U1 | 6/2013 | |
| DE | 102012019855 | A1 | 4/2014 | |
| DE | 102015103519 | A1 | 9/2016 | |
| DE | 102016105950 | A1 | 10/2017 | |
| EP | 0662371 | A1 | 7/1995 | |
| EP | 0703320 | A2 | 3/1996 | |
| EP | 1267001 | A1 | 12/2002 | |
| EP | 1524367 | A2 | 4/2005 | |
| EP | 2251488 | A2 | 11/2010 | |
| EP | 2857587 | A1 | 4/2015 | |
| EP | 2960374 | A1 | 12/2015 | |
| EP | 2804987 | B1 | 11/2017 | |
| EP | 2764161 | B1 | 5/2018 | |
| EP | 2721217 | B1 | 9/2019 | |
| EP | 3594408 | A1 | 1/2020 | |
| EP | 3712330 | A1 | 9/2020 | |
| EP | 3744897 | A1 | 12/2020 | |
| EP | 3456879 | B1 | 5/2021 | |
| EP | 3862487 | A1 | 8/2021 | |
| EP | 3901372 | A1 | 10/2021 | |
| FR | 991824 | A | 10/1951 | |
| FR | 1289210 | A | 3/1962 | |
| GB | 1546 | A | 1/1912 | |
| GB | 942600 | A | 11/1963 | |
| GB | 2481405 | A | 12/2011 | |
| GB | 2549089 | A | 10/2017 | |
| WO | WO2005038139 | A1 | 4/2005 | |
| WO | WO2013034248 | A2 | 3/2013 | |
| WO | WO2013107613 | A1 | 7/2013 | |
| WO | WO2014037115 | A1 | 3/2014 | |
| WO | WO-2018067506 | A1 * | 4/2018 | ............. H02P 29/40 |
| WO | WO2020194728 | A1 | 10/2020 | |
| WO | WO2021131007 | A1 | 7/2021 | |
| WO | WO2021158690 | A1 | 8/2021 | |
| WO | WO2021183325 | A1 | 9/2021 | |
| WO | WO2022184666 | A1 | 9/2022 | |
| WO | WO2022184667 | A1 | 9/2022 | |

(56) References Cited

FOREIGN PATENT DOCUMENTS

| | | | |
|---|---|---|---|
| WO | WO2022184668 | A1 | 9/2022 |
| WO | WO2022184697 | A1 | 9/2022 |

OTHER PUBLICATIONS

WeberMt, “SRE 300 Battery-powered Rammer,” <https://www.webermt.com/US/eng/rammers/sre-300-rammer/> web page visited Aug. 16, 2022.
MultiQuip, “Mikasa Series Model MTe55 Rammer,” Operation Manual, Revision #0, dated Jun. 28, 2021 (20 pages).
MultiQuip, “Mikasa Series Model ME355 Tamping Rammer, ” Parts Manual, Revision #1, dated Nov. 17, 2021 (20 pages).

* cited by examiner

COMPACTING TOOL

CROSS-REFERENCE TO RELATED APPLICATIONS

The present application claims priority to U.S. Provisional Patent Application No. 63/290,681, filed Dec. 17, 2021, the entire content of which is incorporated herein by reference.

FIELD OF THE INVENTION

The present invention relates to compacting tools, such as vibratory rammers.

SUMMARY OF THE INVENTION

The present invention provides, in one aspect, a compacting tool including an upper mass, a lower mass coupled to the upper mass, a driving axis extending centrally through the upper mass and the lower mass, a motive source supported by the upper mass, the motive source including an output shaft, a battery configured to provide power to the motive source, a handle coupled to the upper mass, a user interface supported by the handle and configured to receive an input to control the motive source, and a drive mechanism configured to convert rotational movement of the output shaft to reciprocating movement of the lower mass. The drive mechanism includes a multi-stage transmission operatively coupled between the output shaft of the motive source and the lower mass.

In some aspects, the motive source includes a brushless DC motor, the brushless DC motor having a nominal diameter of at least 80 millimeters.

In some aspects, the multi-stage transmission is a two stage, gear reducing transmission.

In some aspects, the multi-stage transmission includes a first pinion coupled to the output shaft, an idler gear meshed with the first pinion, a second pinion coupled for co-rotation with the idler gear, and a driven gear meshed with the second pinion.

In some aspects, the drive mechanism includes a crankshaft coupled to the driven gear, a connecting rod coupled to the crankshaft and the lower mass, a piston having a first end coupled to the connecting rod and a second end opposite the first end, the piston configured to reciprocate along the driving axis to reciprocate the lower mass relative to the upper mass in response to rotation of the crankshaft, a spring cylinder defined in the lower mass and having a spring assembly supported therein, and a plate coupled to the lower mass and configured to impart impacts to a surface in response to reciprocation of the lower mass.

In some aspects, the idler gear and the driven gear are each rotatable about respective axes orthogonal to the driving axis.

In some aspects, the output shaft defines a rotational axis orthogonal to the driving axis, and the driving axis intersects the motive source.

In some aspects, the upper mass includes an upper mass main body housing and an electronics housing including a battery receptacle that receives the battery, and the electronics housing is coupled to the upper mass main body housing by a vibration damping mechanism.

In some aspects, the battery is slidably coupled to the battery receptacle and is attachable and detachable from the battery receptacle by sliding the battery along a battery axis orthogonal to the driving axis.

In some aspects, an electronic control unit is supported within the electronics housing, the electronic control unit including a printed circuit board and a plurality of switching transistors for controlling a supply of power from the battery to the motive source.

In some aspects, the handle is coupled to the upper mass main body housing by a handle vibration damping mechanism.

In some aspects, an electronic control unit is in communication with the user interface and configured to control operation of the motive source, and a sensor is in communication with the electronic control unit. The electronic control unit is configured to determine occurrence of a safety event based on feedback from the sensor, and to perform a safety action in response to determining that the safety event has occurred. The safety action includes slowing an operating speed of the motive source or shutting off the motive source.

In some aspects, the sensor includes at least one selected from a group consisting of: a biased switch, a tether, an electronic capacitance or resistance sensor, an orientation sensor, and a contact sensor.

In some aspects, the compacting tool includes a clutch mechanism operatively coupled between the output shaft and the drive mechanism. The clutch mechanism is configured to decouple the output shaft from the drive mechanism in response to a rotational speed of the output shaft being below a threshold speed.

In some aspects, the clutch mechanism includes a collar coupled for co-rotation with the output shaft, a plurality of arms pivotally coupled to the collar, each of the plurality of arms including a friction surface, a cover coupled for co-rotation with a pinion, the cover including an inner wall, and a plurality of springs biasing the plurality of arms radially inwardly toward a disengaged position in which the friction surface of each of the plurality of arms is spaced from the inner wall. Each of the plurality of arms is movable to engage the friction surface with the inner wall when the rotational speed of the output shaft is greater than or equal to the threshold speed. Engagement of each friction surface with the inner wall of the cover couples the cover for co-rotation with the collar and the output shaft, such that the output shaft drives the pinion.

The present invention provides, in another aspect, a compacting tool including an upper mass, a lower mass coupled to the upper mass, a driving axis extending centrally through the upper mass and the lower mass, a motive source supported by the upper mass, the motive source including an output shaft, a drive mechanism configured to convert rotational movement of the output shaft to reciprocating movement of the lower mass, a handle configured to be grasped by a user during operation of the compacting tool, an electronic control unit in communication configured to control operation of the motive source, and a sensor in communication with the electronic control unit. The electronic control unit is configured to determine occurrence of a safety event based on feedback from the sensor and to perform a safety action in response to determining that the safety event has occurred, and the safety action includes slowing an operating speed of the motive source or shutting off the motive source.

In some aspects, the safety event includes at least one selected from a group consisting of: the user letting go of the handle, the compacting tool changing orientation, and a portion of the compacting tool coming into contact with a surface.

In some aspects, the sensor includes at least one selected from a group consisting of: a biased switch, a tether, an electronic capacitance or resistance sensor, an orientation sensor, and a contact sensor.

In some aspects, the drive mechanism includes a multi-stage transmission operatively coupled between the output shaft of the motive source and the lower mass, and the compacting tool includes a clutch mechanism operatively coupled between the output shaft and the drive mechanism. The clutch mechanism is configured to decouple the output shaft from the drive mechanism in response to a rotational speed of the output shaft being below a threshold speed.

The present invention provides, in another aspect, a compacting tool including an upper mass, a lower mass coupled to the upper mass, a driving axis extending centrally through the upper mass and the lower mass, a motive source supported by the upper mass, the motive source including an output shaft, a battery configured to provide power to the motive source, a main handle coupled to the upper mass, a user interface supported by the handle and configured to receive an input to control the motive source, a drive mechanism configured to convert rotational movement of the output shaft to reciprocating movement of the lower mass, a plate coupled to the lower mass, the plate configured to impart impacts to a surface in response to reciprocating movement of the lower mass, and a clutch mechanism operatively coupled between the output shaft and the mechanism. The clutch mechanism is configured to decouple the output shaft from the drive mechanism in response to a rotational speed of the output shaft being below a threshold speed.

Other features and aspects of the invention may be apparent upon considering the following detailed description and accompanying drawings.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting.

DETAILED DESCRIPTION

Figure 1:
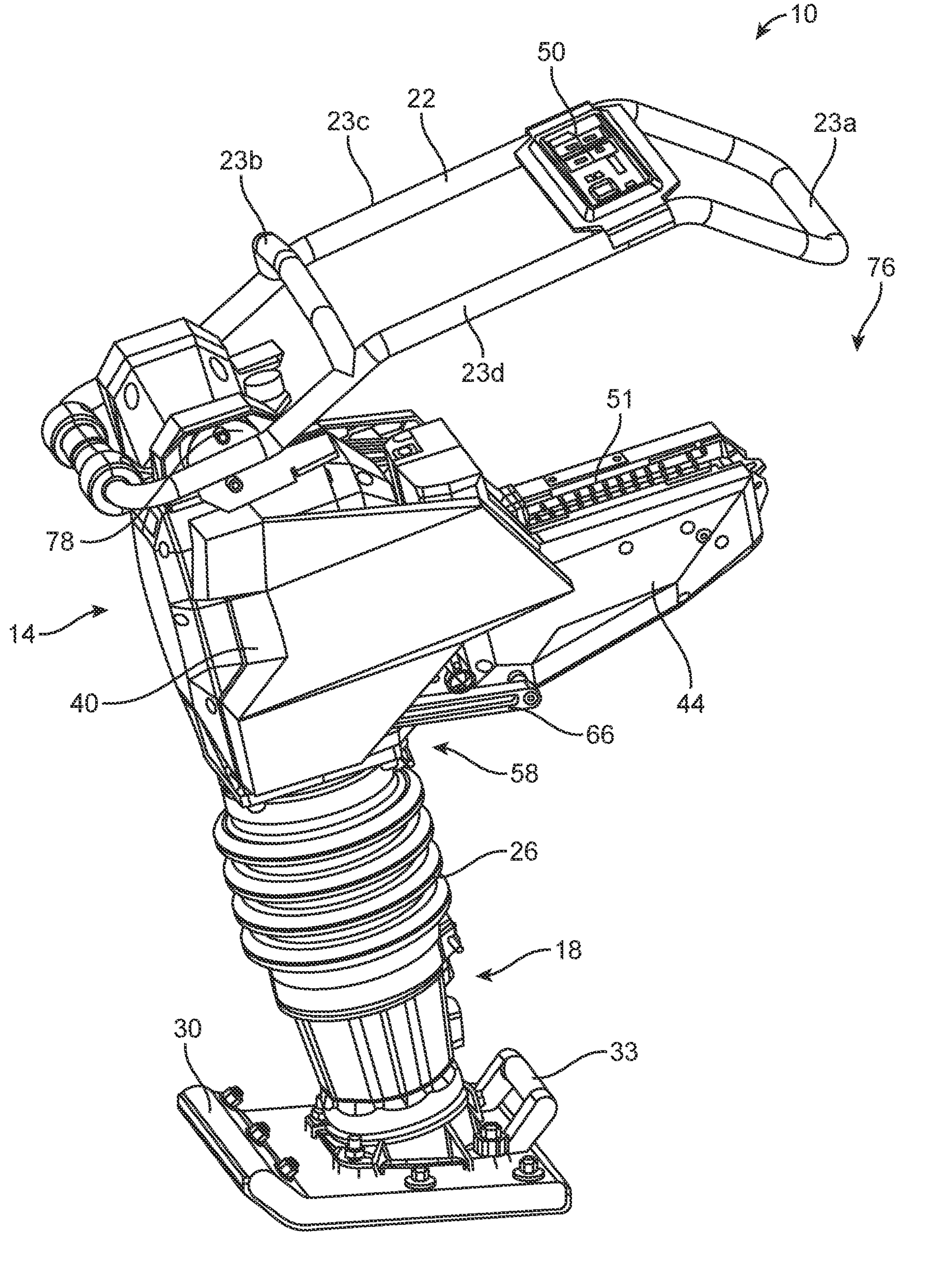
FIG. 1 is a perspective view of a compacting tool according to an embodiment of the disclosure.

FIG. 1 illustrates a compacting tool 10, which is a vibratory rammer in the illustrated embodiment, including an upper mass 14, a lower mass 18 coupled to and movable relative to the upper mass 14, and a handle 22 coupled to the upper mass 14. The lower mass 18 includes a lower mass main body 26 and a rammer plate 30 coupled to the lower mass main body 26. In the illustrated embodiment, the handle 22 includes a grip portion 23*a* configured to be grasped by a user during operation of the compacting tool 10 and a carry handle portion 23*b*. The grip portion 23*a* and the carry handle portion 23*b* each extend between and interconnect laterally spaced frame members 23*c*, 23*d* of the handle 22. The illustrated compacting tool 10 also includes a second carry handle portion 33 coupled to the rammer plate 30. The carry handle portions 23*b*, 33 may be grasped individually or together to facilitate moving and transporting the compacting tool 10 when not in use.

A motive source 34 is coupled to the upper mass 14 and is operably coupled to a drive mechanism or vibratory mechanism 38 (FIG. 3) to move the lower mass 18 relative to the upper mass 14. In the illustrated embodiment, the motive source 34 is an electric motor, and more specifically a brushless DC motor. In some embodiments, the motive source 34 may be a brushless DC motor having a nominal diameter of at least 80 millimeters. In yet other embodiments, the compacting tool 10 may include another type of motive source, including but not limited to a brushless AC motor, a brushed AC motor, a brushed DC motor, or an AC induction motor.

Figure 2:
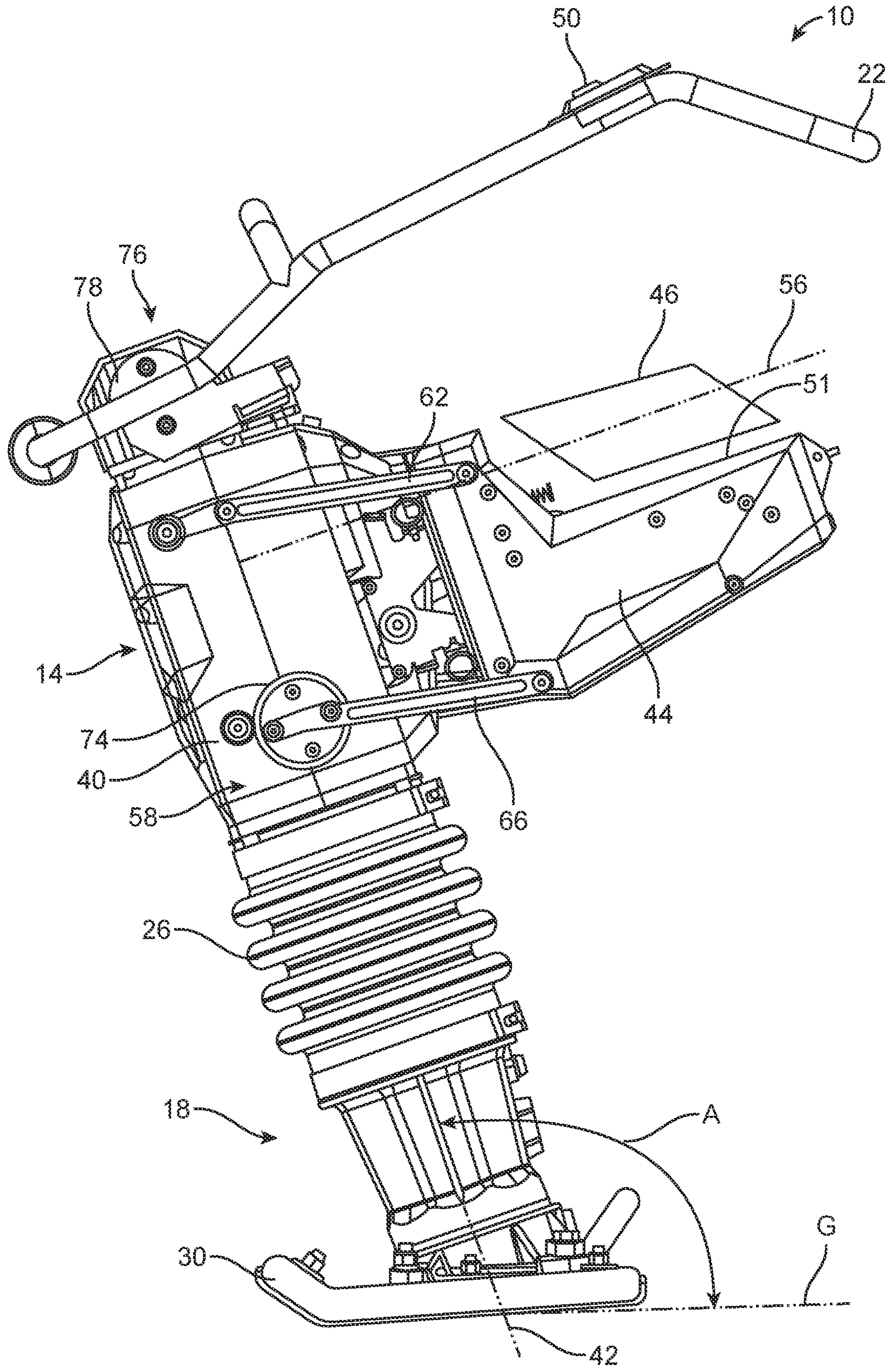
FIG. 2 is a side view of the compacting tool of FIG. 1.

Referring to FIG. 2, the compacting tool 10 also includes a longitudinal or driving axis 42 that extends centrally through the upper mass 14 and the lower mass 18 and in a direction of the movement of the lower mass 18. The driving axis 42 is angled (i.e., at an angle A) relative to a ground surface G during operation. In the illustrated embodiment, the angle is obtuse (e.g., approximately 120 degrees) such that the upper and lower masses 14, 18 are forwardly inclined.

Figure 3:
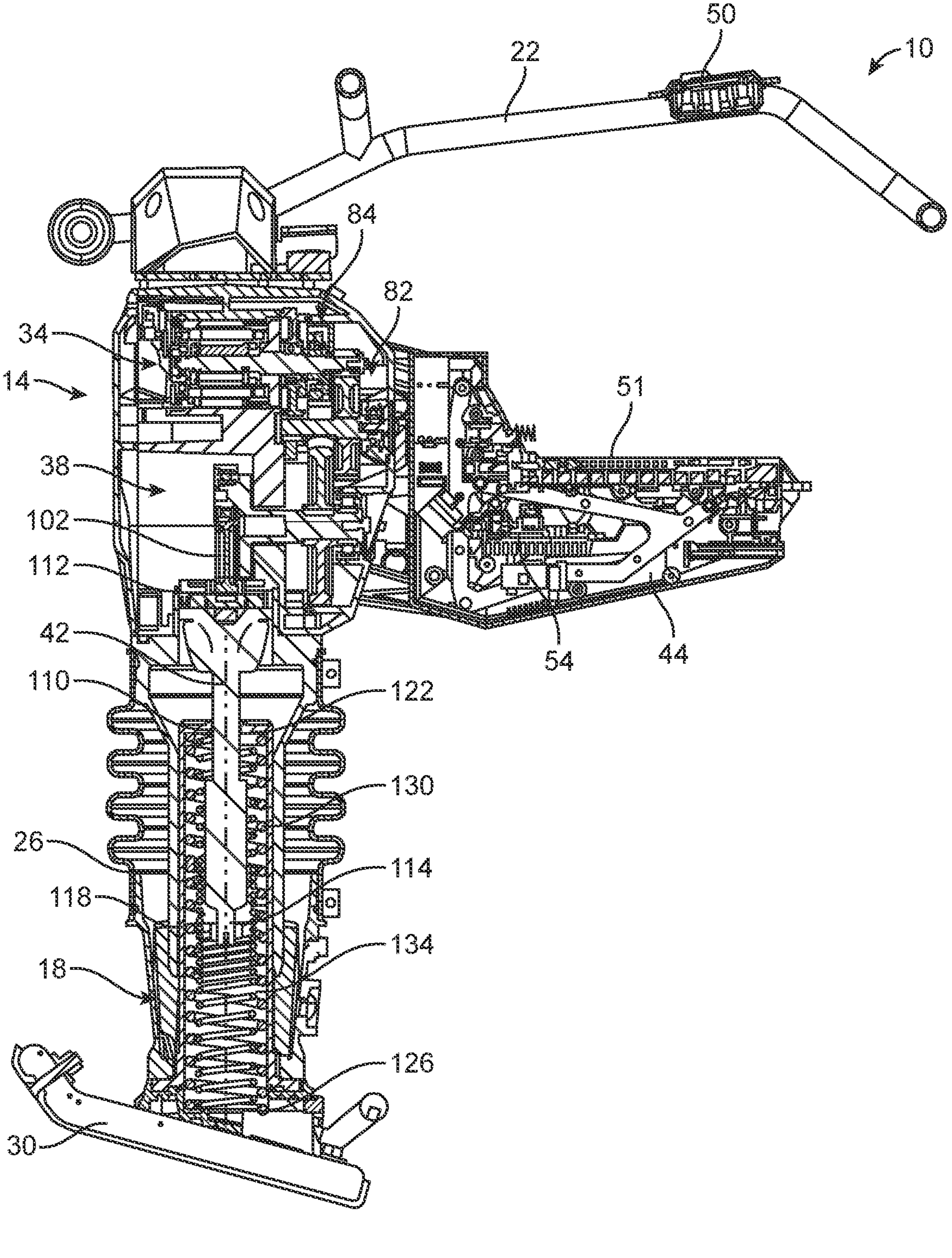
FIG. 3 is a side cross-sectional view of the compacting tool of FIG. 1.
Figure 4:
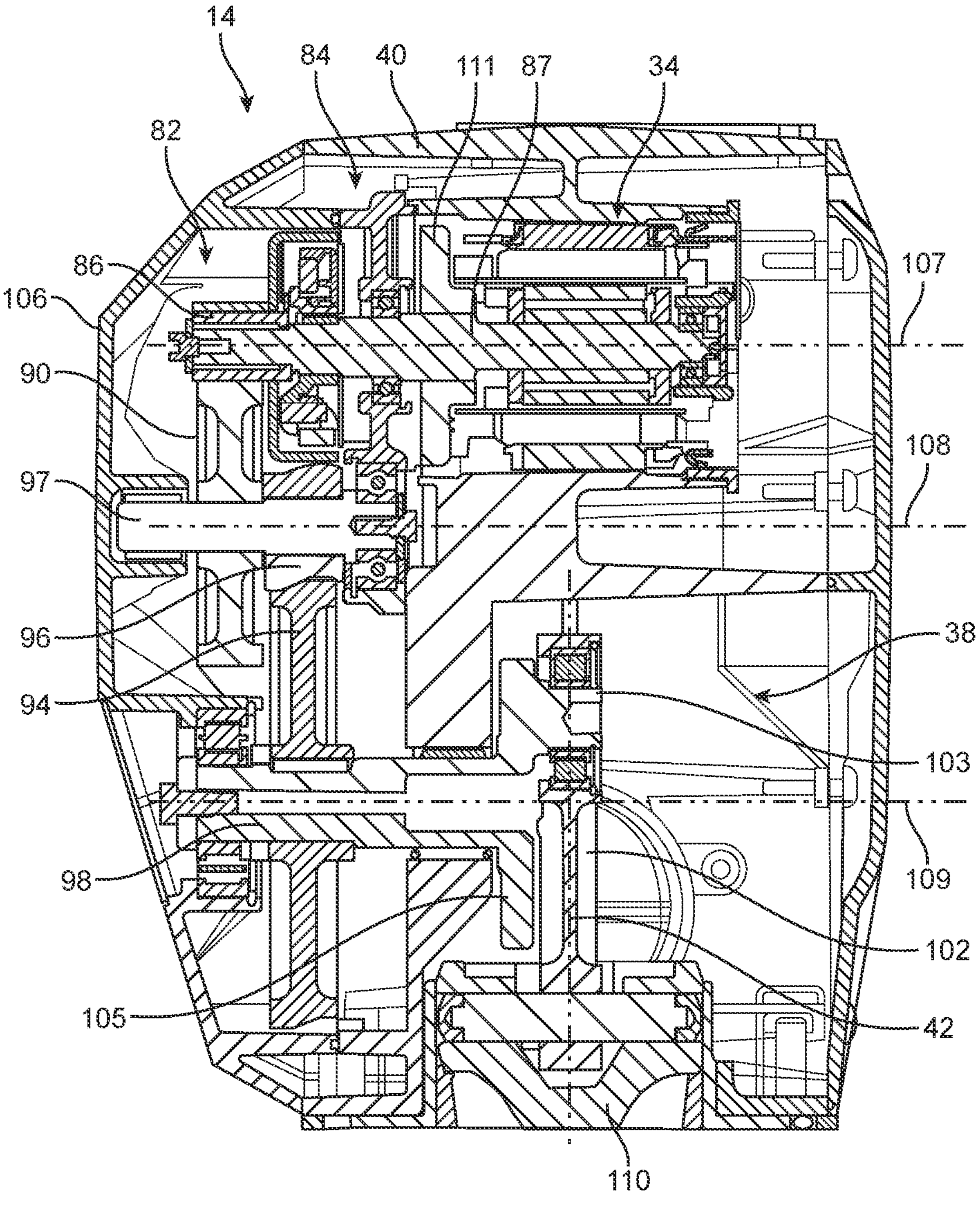
FIG. 4 is a cross-sectional view of a portion of the compacting tool of FIG. 1, illustrating a drive mechanism of the compacting tool.
Figure 5:
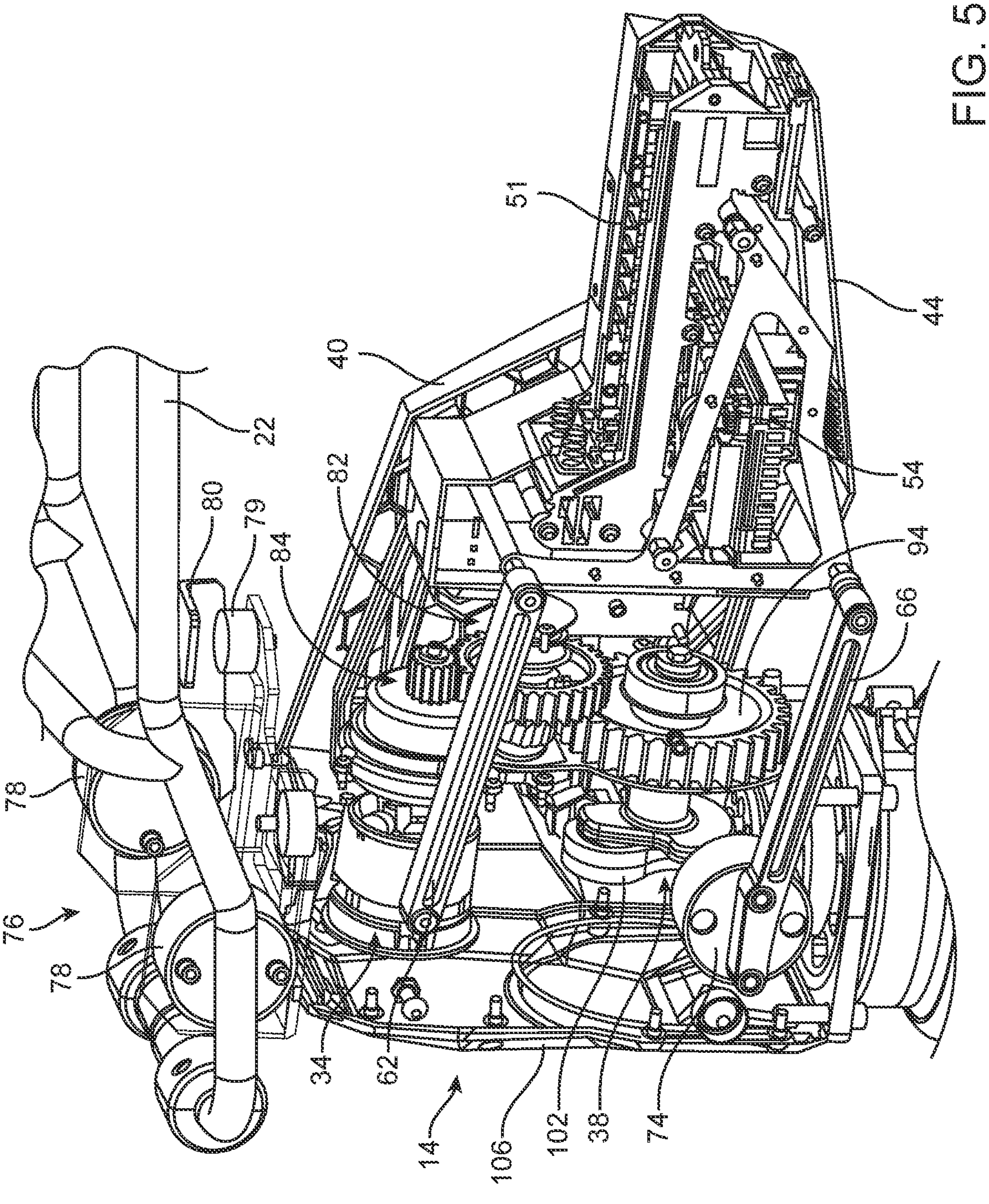
FIG. 5 is a perspective view of a portion of the compacting tool of FIG. 1 with portions of a housing of the compacting tool hidden to illustrate the drive mechanism.

The upper mass 14 includes an upper mass main body housing 40 and an electronics housing 44 that supports a battery 46 and is coupled to the upper mass main body housing 40 through a vibration damping mechanism 58. Referring to FIG. 3, the electronics housing 44 supports an electronic control unit 54 (e.g., a PCB including a microprocessor and other electronic components for controlling operation of the compacting tool 10, the supply of power to the motive source 34, etc.). A user interface 50 is coupled to the handle 22 and electronically coupled to the electronic control unit 54 to allow an operator to operate the compacting tool 10 (e.g., by selectively providing power to the motive source 34). The user interface 50 may also allow the operator to select a mode (e.g., high, medium, or low speed) for the motive source 34 to operate, monitor the state of charge of the battery 46, and the like. The user interface 50 may also include an input device (e.g., a trigger, switch, or the like) that is configured to receive a user input from the operator and a display (e.g., an LCD display) to display operational information (e.g., mode of the compacting tool 10, state of charge of the battery 46, work time remaining, etc.).

The electronic control unit 54 may be in communication with the user interface 50, the battery 46, and/or the motive source 34. The electronic control unit 54 may receive the user input from the user interface 50 to control the motive source 34, monitor conditions of the compacting tool 10 via input from sensors, and the like. In some embodiments, the electronic control unit 54 may include switching transistors (e.g., MOSFETs, IGBTs, or the like) for distributing electrical power from the battery 46 to operate the motive source 34. A heat sink may be provided to enhance heat dissipation from the switching transistors.

Referring again to FIG. 2, the battery 46 is configured to power the motive source 34 in response to the user input received by the user interface 50. The battery 46 is slidably coupled to a battery receptacle 51 on the electronics housing (e.g., via a cooperating rail arrangement), such that the battery 46 may be attached and detached from the receptacle 51 by sliding the battery 46 along a battery axis 56. The battery axis 56 is orthogonal to the driving axis 42 of the compacting tool 10 in the illustrated embodiment. In other embodiments, the battery axis 56 may be parallel to the driving axis 42 or positioned in an alternative orientation relative to the driving axis 42. In some embodiments, the battery 46 may have a nominal output voltage between 40-Volts and 80-Volts. In other embodiments, the battery 46 may have a nominal output voltage between 60-Volts and 100-Volts. In other embodiments, the battery 46 may have other output voltages, including but not limited to 96-Volts, 120-Volts, or 240-Volts.

The electronics housing 44, the battery receptacle 51, the battery 46, the electronic control unit 54, and the user interface 50 are each positioned on a first, (e.g., rear) side of the compacting tool 10 relative to the driving axis 42. In addition, as described in greater detail below, the electronics housing 44 and the battery 46 are coupled to the upper mass 14 by the vibration damping mechanism 58, which reduces the amount of vibration on potentially sensitive electronic components during operation of the compacting tool 10.

Referring to FIG. 2, the vibration damping mechanism 58 includes a linkage system having a pair of first, upper links 62 and a pair of second, lower links 66 (only one link 62, 66 of each pair is visible in FIG. 2) extending between the upper mass main body housing 40 and the electronics housing 44. In more detail, a first end of each first link 62 is pivotally coupled to the upper mass main body housing 40, a first end of each second link 66 is pivotally coupled to the upper mass main body housing 40, and the electronics housing 44 is pivotably coupled to a second end of each of the first and second links 62, 66. The vibration damping mechanism 58 also includes linkage isolators 74 (e.g., elastomeric isolators), which are positioned between the first end of one or both of the first and second links 62, 66 and the upper mass main body housing 40. In the illustrated embodiment, the linkage isolator is positioned between the first end of the first link 62 and the upper mass main body housing 40 on each side of the compacting tool 10.

The linkage system may translate in such a way that the electronics housing 44 and the battery 46 coupled thereto moves substantially parallel to the driving axis 42. The range of motion of the vibration damping mechanism 58 may be limited between a lower stop position, where the electronics housing 44 contacts the upper mass main body housing 40, and an upper stop position, where the electronics housing 44 also contacts the upper mass main body housing 40. The linkage isolators 74 are also configured to restrict movement of the linkage assembly near the upper and lower stop positions. In other words, the linkage isolators 74 are configured to absorb forces from the translational movement of the battery 46 along the battery axis 56 near the upper and lower stop positions, thereby protecting the battery 46 from being damaged by vibration.

The illustrated compacting tool 10 also includes a handle vibration damping mechanism 76 positioned between the handle 22 and the upper mass 14, which reduces the amount of vibration transmitted from the upper mass 14 to the handle 22. In the illustrated embodiment, the handle vibration damping mechanism 76 includes an elastomeric torsion handle isolator 78. The handle isolator 78 pivotably couples the handle 22 to the upper mass 14. As such, the handle 22 may pivot relative to the driving axis 42 and the handle isolator 78 is configured to absorb forces and reduce vibration transmitted to the handle 22 and thereby reduces vibration transmitted to the user interface 50 and to a user grasping the handle 22 during operation of the compacting tool 10. In the illustrated embodiment, stops 79 fixed to the main body housing 40 of the upper mass 14 are configured to engage brackets 80 extending from the handle 22 to limit pivoting movement of the handle 22.

Now with reference to FIGS. 3-6, the vibratory mechanism 38 may include a multi-stage gear reduction or transmission 82 and a clutch mechanism 84 positioned between the motive source 34 and the lower mass 18. Best illustrated in FIG. 4, the multi-stage transmission 82 includes a pinion 86 coupled to an output shaft 87 of the motive source 34 (via the clutch mechanism 84), an idler gear 90 meshed with the pinion 86, a driven gear 94 meshed with a second pinion 96 of the idler gear 90, and a crankshaft 98 coupled to the driven gear 94. The idler gear 90 and second pinion 96 are each supported on and coupled for co-rotation with an intermediate shaft 97. The crankshaft 98 is coupled to a connecting rod 102 via an eccentric boss 103 such that rotation of the crankshaft 98 is converted into reciprocating movement of the connecting rod 102. The connecting rod 102 is operably coupled to a piston 110, which reciprocates the lower mass 18 and the rammer plate 30 during operation. In the illustrated embodiment, the crankshaft 98 includes a counterweight portion 105 positioned on an opposite side of the axis 109 relative to the eccentric boss 103 to reduce vibrations on the crankshaft 98. A flywheel mass 111 is coupled to the output shaft 87 to increase a rotational inertia of the output shaft 87. In some embodiments, the flywheel mass 111 may be configured as a fan rotatable with the output shaft 87 to generate a cooling airflow for cooling the motive source 34, the multi-stage transmission 82, and/or other components of the compacting tool 10.

In the illustrated embodiment, a transmission cover 106 encloses the multi-stage transmission 82 within the upper mass main body housing 40. The transmission cover 106 may be removable to facilitate installation of the transmission 82 during assembly of the compacting tool 10 and to facilitate servicing (e.g., lubrication) of the transmission 82. A motive source rotational axis 107 extends centrally through the motive source 34 and is orthogonal to the driving axis 42. The output shaft 87 is rotatable about the motive source rotational axis 107. In addition, rotational axes 108, 109 of the idler gear 90 and the driven gear 94 are parallel to the rotational axis 107 and orthogonal to the driving axis 42. In addition, the driving axis 42 intersects the motive source 34 while the pinion 86, the idler gear 90, and the driven gear 94 are offset and parallel to the driving axis 42. The illustrated arrangement of the axes 42, 107, 108, 109 provides for a compact arrangement of the motive source 34 and the vibratory mechanism 38 with a relatively large gear reduction ratio between the motive source 34 and the vibratory mechanism 38. For example, the gear ratio may be greater than 12:1 in some embodiments, greater than 15:1 in some embodiments, or about 15.2:1 in the illustrated embodiment. In embodiments in which the motive source 34 is a brushless DC motor, the motor may be driven at a high speed e.g., greater than 10,000 revolutions per minute (RPM), providing efficient operation.

With reference to FIG. 3, the piston 110 includes a first end 112 coupled to the connecting rod 102 and a second end 114 positioned within a spring cylinder 118 extending through the lower mass main body 26. The spring cylinder 118 further includes a first, upper spring cylinder surface 122 and a second, bottom spring cylinder surface 126. An upper spring assembly 130 is positioned within the spring cylinder 118 between the upper spring cylinder surface 122 and the second end 114 of the piston 110. Further, a lower spring assembly 134 is positioned within the spring cylinder 118 between the second end 114 of the piston 110 and the bottom spring cylinder surface 126.

In the illustrated embodiment, the multi-stage transmission 82 is a two-stage transmission. In other embodiments, the multi-stage transmission may include more than two stages, as well as other gear arrangements, such as a single or multi-stage planetary gear arrangement. Due to the multi-stage transmission 82, the motive source 34 of the compacting tool 10 can therefore operate at high rotational speeds and the multi-stage transmission 82 reduces or steps down the speed of the motive source 34, which increases the torque delivered to the lower mass 18 and reduces the operating speed of the lower mass 18. In addition, the compacting tool 10 has higher motive source efficiency, increased cooling and thermal protection for the motive source 34, and a compact driveline configuration. In particular, the compact driveline configuration allows the weight of the motive source 34 and vibratory mechanism 38 to be located near the driving axis 42, which increases stability, usability, and performance of the compacting tool 10. In the illustrated embodiment, the multi-stage transmission 82 may reciprocate the lower mass 18 and therefore the rammer plate 30 at rates between 500 beats per minute (BPM) and 800 BPM when the motive source 34 operates between 8,000 RPM and 12,000 RPM. In some embodiments, the BPM output of the compacting tool 10 may be adjusted between a plurality of different rates based on a selected operating mode (e.g., selected via the user interface 50). For example, the compacting tool 10 may be operable in a low speed mode at 575 BPM to 625 BPM in some embodiments, and a high speed mode at 655 BPM to 705 BPM in some embodiments. In the illustrated embodiment, the BPM output of the compacting tool 10 may be about 600 BPM in the low speed mode and about 680 BPM in the high speed mode. In addition, the motive source 34 may operate at a speed of about 10,350 RPM in the low speed mode, and about 11,500 RPM in the high speed mode.

Figure 6:
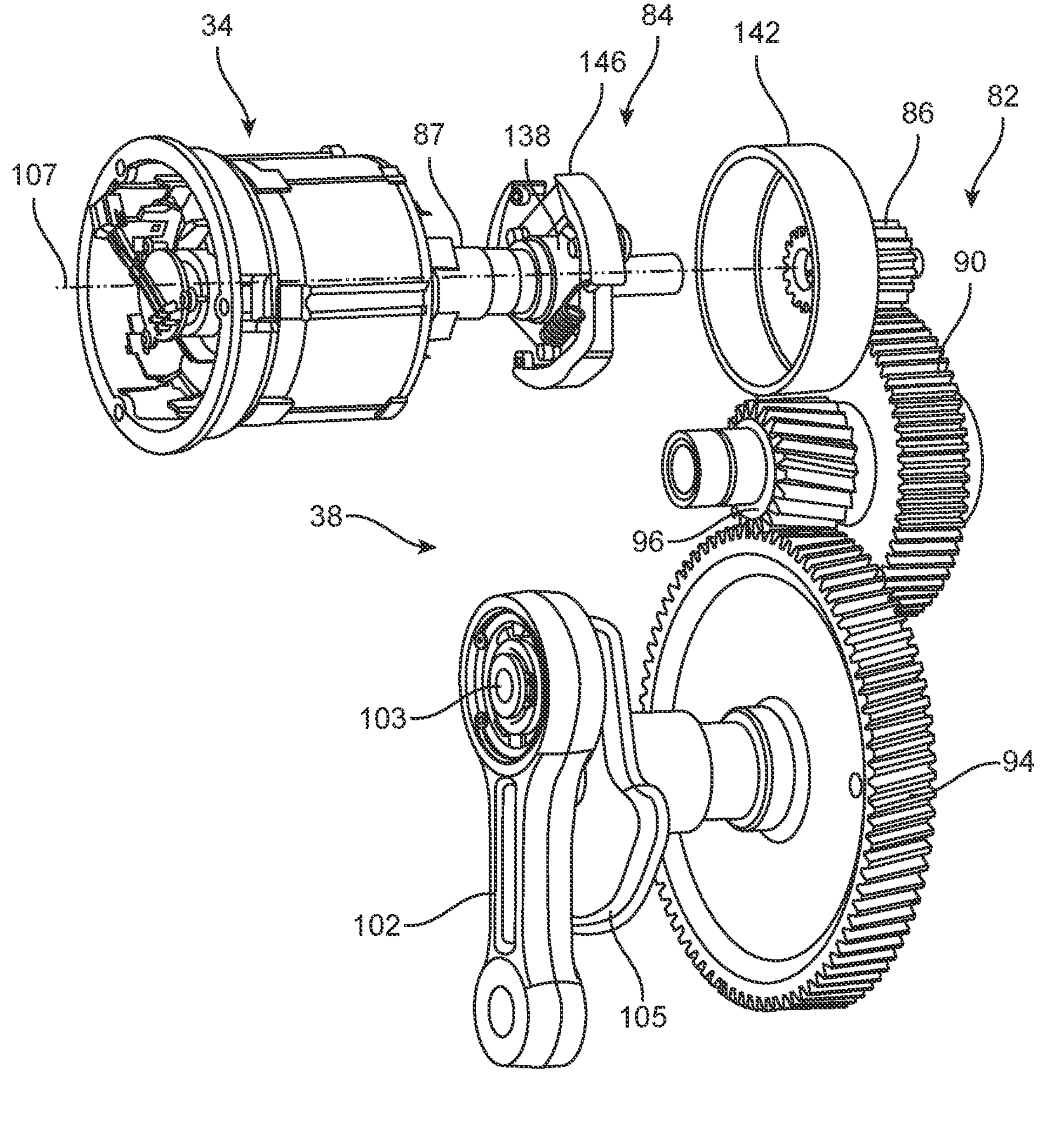
FIG. 6 is a perspective view of the drive mechanism of the compacting tool of FIG. 1.
Figure 7:
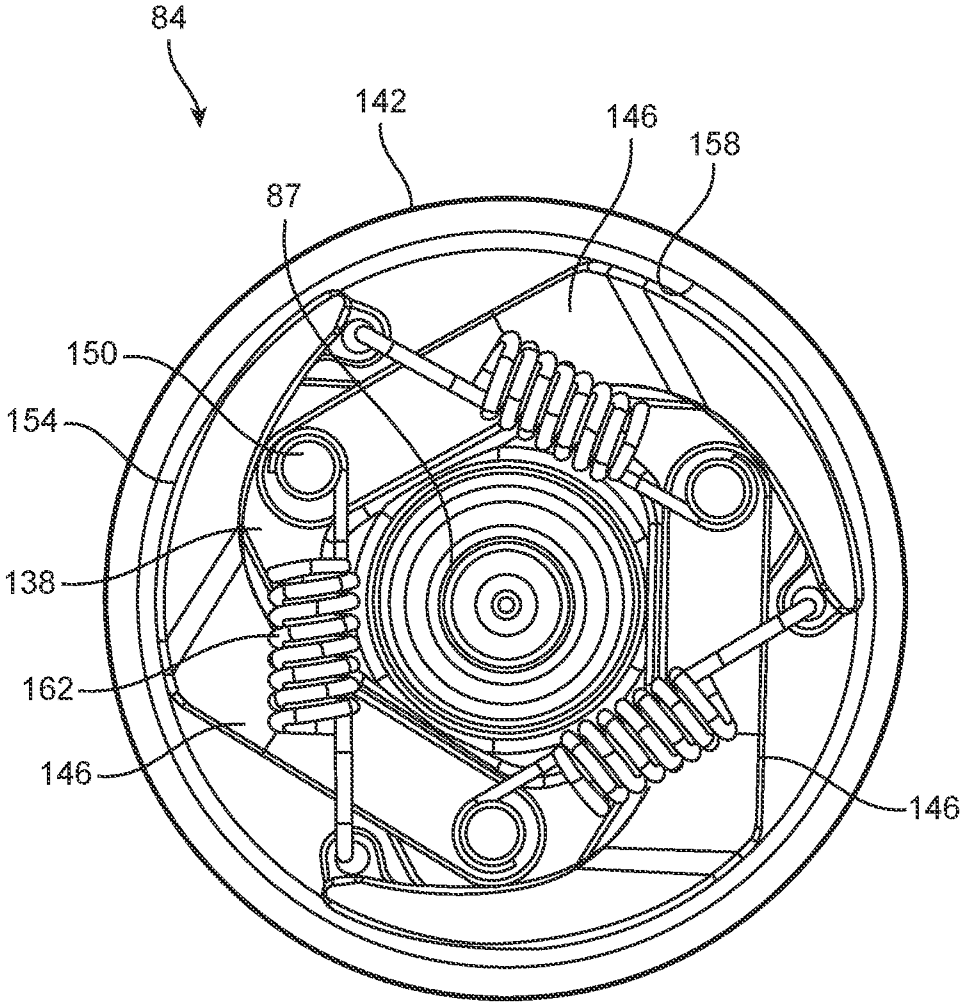
FIG. 7 is a plan view illustrating a clutch mechanism of the compacting tool of FIG. 1.

The clutch mechanism 84 will now be described with reference to FIGS. 6-7. The illustrated clutch mechanism 84 includes a collar 138 coupled for co-rotation with the output shaft 87, a cover 142 coupled for co-rotation with the pinion 86, and a plurality of arms 146. The arms 146 are pivotally coupled to the collar 138 by respective pins 150 (FIG. 7). Each of the arms 146 includes a friction surface 154 that is curved to match a curvature of an inside wall 158 of the cover 142. A plurality of springs 162 (e.g., tension springs) biases the arms 146 toward a retracted or disengaged position, illustrated in FIG. 7, in which the friction surfaces 154 of the arms 146 are spaced from the inside wall 158. The springs 162 each have one end anchored to a respective one of the pins 150, and an opposite end coupled to a respective one of the arms 146. In other embodiments, other biasing configurations may be used to bias the arms 146 toward the disengaged position.

The arms 146 are configured to move radially outwardly toward an extended or engaged position, in which the friction surfaces 154 of the arms 146 engage the inside wall 158 of the cover 142, in response to rotation of the output shaft 87 exceeding a predetermined threshold speed. In some embodiments, the threshold speed may be between 5,500 and 6,500 RPM, or about 6,000 RPM in some embodiments. When the motive source 34 drives the output shaft 87 at a speed below the threshold speed, centrifugal forces acting on the arms 146 are less than the biasing forces provided by the springs 162, such that the arms 146 remain in the disengaged position. Thus, no torque is transmitted to the cover 142, and thus, the pinion 86 and downstream components of the vibratory mechanism 38 are rotationally decoupled from the output shaft 87. When the motive source 34 drives the output shaft 87 at a speed greater than or equal to the threshold speed, the centrifugal forces on the arms 146 are sufficient to overcome the biasing forces of the springs 162, such that the friction surface 154 move outward and into engagement with the inside wall 158 of the cover 142. The frictional engagement between the friction surfaces 154 and the cover 142 couples the cover 142 for co-rotation with the collar 138 and the arms 146, and the clutch mechanism 84 thereby transfers torque from the output shaft 87 to the pinion 86.

To operate the compacting tool 10, the user sends a command via the user interface 50 to activate the motive source 34. When the output shaft 87 reaches the predetermined threshold speed, the clutch mechanism 84 couples the motive source 34 to the multi-stage transmission 82, which converts rotational movement from the motive source 34 into reciprocating movement of the lower mass 18. In particular, the transmission 82 drives the crankshaft 98 and connecting rod 102 to reciprocate the piston 110 along the driving axis 42. As the piston 110 reciprocates downward toward the rammer plate 30, the second end 114 of the piston 110 compresses the lower spring assembly 134, while the upper spring assembly 130 extends. As the piston 110 reciprocates upward, the second end 114 of the piston 110 compresses the upper spring assembly 130, while the lower spring assembly extends. Continuous reciprocation of the piston 110 causes the lower mass 18 and the rammer plate 30 to impart a vibratory impact on the ground surface G.

If the operating speed of the motive source 34 falls below the threshold speed of the clutch mechanism 84, the clutch mechanism 84 disengages (i.e. the arms 146 move inwardly under the influence of the springs 162). This disconnects the output shaft 87 from the pinion 86 and thereby stops reciprocation of the piston 110, even though the output shaft 87 of the motive source 34 may continue rotating at a speed less than the threshold speed. The clutch mechanism 84 allows for the vibratory mechanism 38 to be quickly stopped without requiring braking of the motive source 34. The clutch mechanism 84 may also provide protection for the motive source 34 in the event that the vibratory mechanism 38 encounters an obstruction or becomes jammed, by disconnecting the motive source 34 from the vibratory mechanism 38

Figure 8:
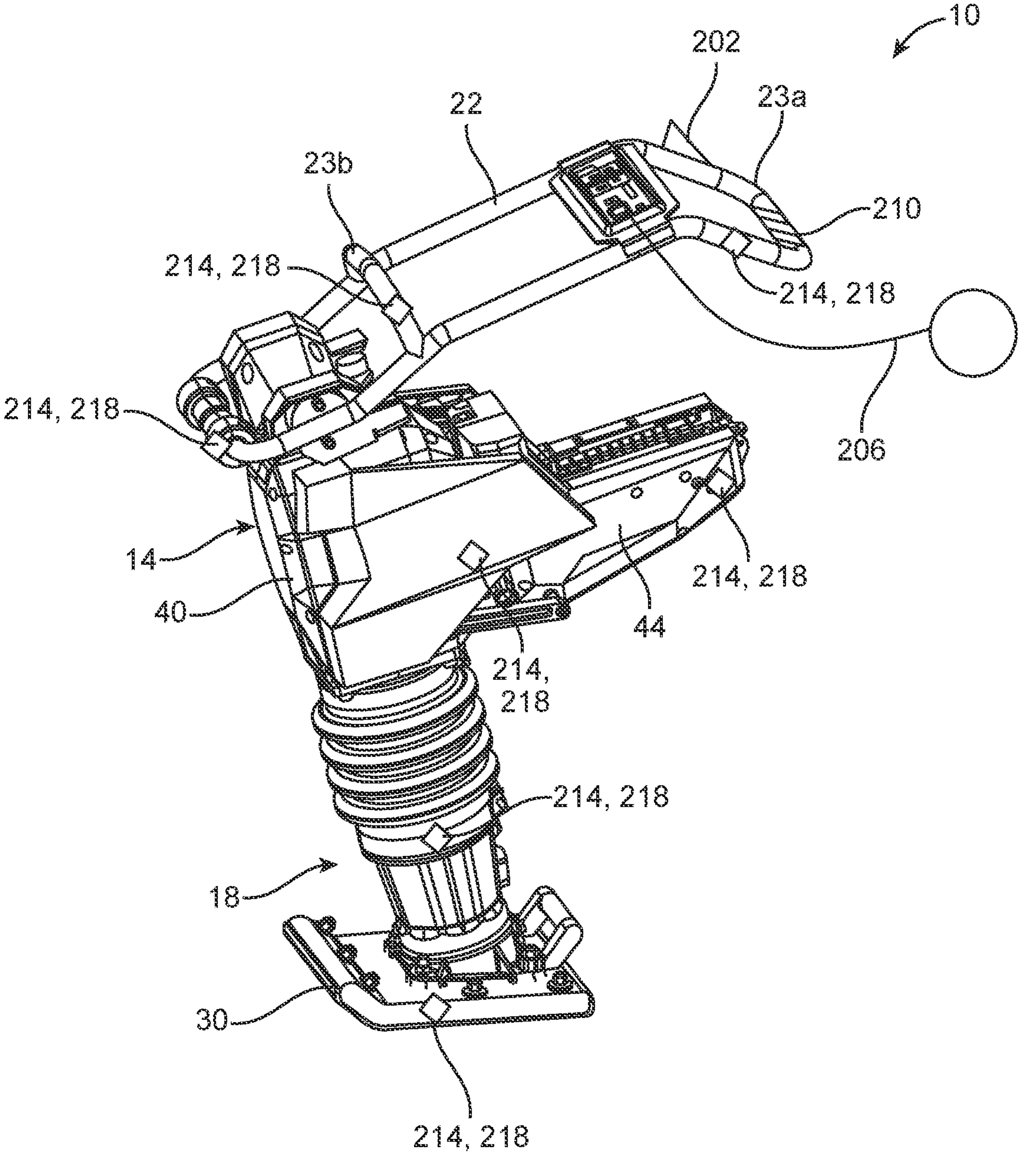
FIG. 8 is a perspective view illustrating a tip detection system of the compacting tool of FIG. 1.

With reference to FIG. 8, the illustrated compacting tool 10 may include one or more sensors for detecting if the compacting tool 10 has tipped over during operation. For example, in some embodiments, the compacting tool 10 may include one or more of a biased safety switch 202 (commonly referred to as a dead-man's switch), a tether 206, an electrical capacitance or resistance sensor 210, a orientation sensor 214 (e.g., an accelerometer, gyroscope, angle sensor, or the like), and a contact sensor 218.

Tipping may occur if a user inadvertently lets go of the handle 22. As described in greater detail below, the sensor(s) 202, 206, 210, 214, 218 can provide a signal to the electronic control unit 54 indicating that a safety event has occurred. The safety event may include the user letting go of the handle 22, the compacting tool 10 having an unexpected motion or orientation, or a portion of the compacting tool 10 (apart from the rammer plate 30) hitting the ground. In some embodiments, a safety event may also be detected by monitoring current drawn by the motive source 34 and the rotational speed of the output shaft 87 to determine whether the compacting tool 10 is operating with unexpected load conditions (e.g., if the rammer plate 30 is not in contact with the ground). In response to the safety event, the electronic control unit 54 may perform a safety action, including but not limited to slowing the motive source 34 to a speed below the threshold speed or de-energizing the motive source 34, to disable the vibratory mechanism 38. With the vibratory mechanism 38 disabled, the user may more easily regain control of the compacting tool 10 and resume operation.

The biased safety switch 202 is located on the handle 22 in the illustrated embodiment and is biased toward an off-position. The safety switch 202 may be depressed by the user in order to enable operation of the compacting tool 10. If the switch 202 is released during operation, the switch 202 automatically moves to the off-position, sending a signal indicating occurrence of a safety event to the electronic control unit 54. The electronic control unit 54 may then perform the safety action.

The tether 206 has a first end coupled to the compacting tool 10 (e.g., at the handle 22, the user interface 50, or any other suitable location) and a second, opposite end configured to be attached to the user of the compacting tool 10. If the user lets go of the compacting tool 10 or the compacting tool 10 tips over, the length of the tether 206 is configured such that the first end of the tether 206 will detach from the compacting tool 10. This sends a signal indicating occurrence of a safety event to the electronic control unit 54. The electronic control unit 54 may then perform the safety action. The electronic control unit 54 may also prohibit the compacting tool 10 from resuming operation until the first end of the tether 206 is reattached.

The electrical sensor 210 may be located on the grip portion 23*a* of the handle 22. When the user is grasping the grip portion 23*a* during operation of the compacting tool 10, the electrical sensor 210 detects the presence of the user's hand, due to changes in electrical capacitance or resistance. Similar to the safety switch 202, if the user's hand is removed, the electrical sensor 210 sends a signal indicating occurrence of a safety event to the electronic control unit 54. The electronic control unit 54 may then perform the safety action.

With continued reference to FIG. 8, the illustrated compacting tool 10 includes a plurality of orientation sensors 214, located at various different points. For example, the orientation sensors 214 may be located on the handle 22, the main body housing 40, the electronics housing 44, the lower mass 18, and the rammer plate 30. The electronic control unit 54 may determine from the orientation sensors 214 if the compacting tool 10 departs from an acceptable angle range relative to a vertical axis, if the compacting tool 10 falls and hits the ground, and/or if the rammer plate 30 is reciprocating without contacting the ground. Each of these indications may indicate the occurrence of a safety event and therefore cause the electronic control unit 54 to perform the safety action. The compacting tool 10 may additionally or alternatively include contact sensors 218 located at various different points, and preferably points at the outermost surfaces of the compacting tool 10. The contact sensors 218 may provide a signal indicating a safety event of the compacting tool 10 falls and hits the ground, causing the electronic control unit 54 to perform the safety action.

Thus, the present disclosure provides, among other things, a compacting tool with a multi-stage transmission able to develop a large amount of torque (and resultant impact force) from a brushless DC motor operating at high speeds. This allows the compacting tool to be powered by a battery pack while providing comparable performance to pneumatic and combustion engine powered compacting tools. Furthermore, the compacting tool may include safety-enhancing features, such as a clutch mechanism and tipping sensors. Finally, although the compacting tool described and illustrated herein is embodied as a vibratory rammer, in other embodiments, the compacting tool may be configured in other ways, such as a plate compactor or a powered tamper.

Various features and aspects of the invention are set forth in the following claims.

What is claimed is:

1. A compacting tool comprising:
- an upper mass;
- a lower mass coupled to the upper mass;
- a driving axis extending centrally through the upper mass and the lower mass;
- a motive source supported by the upper mass, the motive source including an output shaft;
- a battery configured to provide power to the motive source;
- a handle coupled to the upper mass;
- a user interface supported by the handle and configured to receive an input to control the motive source; and
- a drive mechanism configured to convert rotational movement of the output shaft to reciprocating movement of the lower mass,
- wherein the drive mechanism includes a multi-stage transmission operatively coupled between the output shaft of the motive source and the lower mass.

2. The compacting tool of claim 1, wherein the motive source includes a brushless DC motor, the brushless DC motor having a nominal diameter of at least 80 millimeters.

3. The compacting tool of claim 1, wherein the multi-stage transmission is a two stage, gear reducing transmission.

4. The compacting tool of claim 1, wherein the multi-stage transmission includes
- a first pinion coupled to the output shaft,
- an idler gear meshed with the first pinion,
- a second pinion coupled for co-rotation with the idler gear, and
- a driven gear meshed with the second pinion.

5. The compacting tool of claim 4, wherein the drive mechanism includes
- a crankshaft coupled to the driven gear,
- a connecting rod coupled to the crankshaft and the lower mass,
- a piston having a first end coupled to the connecting rod and a second end opposite the first end, the piston configured to reciprocate along the driving axis to reciprocate the lower mass relative to the upper mass in response to rotation of the crankshaft,
- a spring cylinder defined in the lower mass and having a spring assembly supported therein, and
- a plate coupled to the lower mass and configured to impart impacts to a surface in response to reciprocation of the lower mass.

6. The compacting tool of claim 4, wherein the idler gear and the driven gear are each rotatable about respective axes orthogonal to the driving axis.

7. The compacting tool of claim 1, wherein the output shaft defines a rotational axis orthogonal to the driving axis, and wherein the driving axis intersects the motive source.

8. The compacting tool of claim 1, wherein the upper mass includes an upper mass main body housing and an electronics housing including a battery receptacle that receives the battery, wherein the electronics housing is coupled to the upper mass main body housing by a vibration damping mechanism.

9. The compacting tool of claim 8, wherein the battery is slidably coupled to the battery receptacle and is attachable and detachable from the battery receptacle by sliding the battery along a battery axis orthogonal to the driving axis.

10. The compacting tool of claim 8, further comprising an electronic control unit supported within the electronics housing, the electronic control unit including a printed circuit board and a plurality of switching transistors for controlling a supply of power from the battery to the motive source.

11. The compacting tool of claim 8, wherein the handle is coupled to the upper mass main body housing by a handle vibration damping mechanism.

12. The compacting tool of claim 1, further comprising an electronic control unit in communication with the user interface and configured to control operation of the motive source; and a sensor in communication with the electronic control unit, wherein the electronic control unit is configured to determine occurrence of a safety event based on feedback from the sensor, and to perform a safety action in response to determining that the safety event has occurred, and wherein the safety action includes slowing an operating speed of the motive source or shutting off the motive source.

13. The compacting tool of claim 12, wherein the sensor includes at least one selected from a group consisting of: a biased switch, a tether, an electronic capacitance or resistance sensor, an orientation sensor, and a contact sensor.

14. The compacting tool of claim 1, further comprising a clutch mechanism operatively coupled between the output shaft and the drive mechanism, wherein the clutch mechanism is configured to decouple the output shaft from the drive mechanism in response to a rotational speed of the output shaft being below a threshold speed.

15. The compacting tool of claim 14, wherein the clutch mechanism includes a collar coupled for co-rotation with the output shaft, a plurality of arms pivotally coupled to the collar, each of the plurality of arms including a friction surface, a cover coupled for co-rotation with a pinion, the cover including an inner wall, and a plurality of springs biasing the plurality of arms radially inwardly toward a disengaged position in which the friction surface of each of the plurality of arms is spaced from the inner wall, wherein each of the plurality of arms is movable to engage the friction surface with the inner wall when the rotational speed of the output shaft is greater than or equal to the threshold speed, and wherein engagement of each friction surface with the inner wall of the cover couples the cover for co-rotation with the collar and the output shaft, such that the output shaft drives the pinion.

16. A compacting tool comprising:

an upper mass;

a lower mass coupled to the upper mass;

a driving axis extending centrally through the upper mass and the lower mass;

a motive source supported by the upper mass, the motive source including an output shaft;

a drive mechanism configured to convert rotational movement of the output shaft to reciprocating movement of the lower mass;

a handle configured to be grasped by a user during operation of the compacting tool;

an electronic control unit in communication configured to control operation of the motive source; and a sensor in communication with the electronic control unit, wherein the electronic control unit is configured to determine occurrence of a safety event based on feedback from the sensor, and to perform a safety action in response to determining that the safety event has occurred, wherein the safety action includes slowing an operating speed of the motive source or shutting off the motive source, and wherein the sensor includes at least one selected from a group consisting of: a biased switch, a tether, an electronic capacitance or resistance sensor, an orientation sensor, and a contact sensor.

17. The compacting tool of claim 16, wherein the safety event includes at least one selected from a group consisting of: the user letting go of the handle, the compacting tool changing orientation, and a portion of the compacting tool coming into contact with a surface.

18. The compacting tool of claim 16, wherein the drive mechanism includes a multi-stage transmission operatively coupled between the output shaft of the motive source and the lower mass, and wherein the compacting tool further comprises a clutch mechanism operatively coupled between the output shaft and the drive mechanism, wherein the clutch mechanism is configured to decouple the output shaft from the drive mechanism in response to a rotational speed of the output shaft being below a threshold speed.

19. A compacting tool comprising:

an upper mass;

a lower mass coupled to the upper mass;

a driving axis extending centrally through the upper mass and the lower mass;

a motive source supported by the upper mass, the motive source including an output shaft;

a battery configured to provide power to the motive source;

a handle coupled to the upper mass;

a user interface supported by the handle and configured to receive an input to control the motive source;

a drive mechanism configured to convert rotational movement of the output shaft to reciprocating movement of the lower mass;

a plate coupled to the lower mass, the plate configured to impart impacts to a surface in response to reciprocating movement of the lower mass; and a clutch mechanism operatively coupled between the output shaft and the mechanism, wherein the clutch mechanism is configured to decouple the output shaft from the drive mechanism in response to a rotational speed of the output shaft being below a threshold speed.

* * * * *